(12) United States Patent
Teraoka

(10) Patent No.: US 11,333,850 B2
(45) Date of Patent: May 17, 2022

(54) CAMERA LENS

(71) Applicant: AAC Optics Solutions Pte. Ltd., Singapore (SG)

(72) Inventor: Hiroyuki Teraoka, Osaka (JP)

(73) Assignee: AAC Optics Solutions Pte. Ltd., Singapore (SG)

(*) Notice: Subject to any disclaimer, the term of this patent is extended or adjusted under 35 U.S.C. 154(b) by 181 days.

(21) Appl. No.: 16/726,977

(22) Filed: Dec. 26, 2019

(65) Prior Publication Data
US 2020/0409035 A1    Dec. 31, 2020

(30) Foreign Application Priority Data
Jun. 28, 2019 (JP) .............................. JP2019-120621

(51) Int. Cl.
| *G02B 9/60* | (2006.01) |
| *G02B 13/18* | (2006.01) |
| G02B 3/04 | (2006.01) |
| G02B 13/00 | (2006.01) |
| G02B 5/00 | (2006.01) |
| G02B 27/00 | (2006.01) |

(52) U.S. Cl.
CPC .............. *G02B 9/60* (2013.01); *G02B 13/18* (2013.01); *G02B 3/04* (2013.01); *G02B 5/005* (2013.01); *G02B 13/0045* (2013.01); *G02B 27/0025* (2013.01)

(58) Field of Classification Search
CPC ...... G02B 13/0045; G02B 9/60; G02B 13/18; G02B 5/005; G02B 27/0025; G02B 3/04

USPC .................. 359/714, 740, 763, 764
See application file for complete search history.

(56) References Cited

U.S. PATENT DOCUMENTS

| 2012/0327520 | A1* | 12/2012 | Tsai | ................... | G02B 13/0045 359/714 |
| 2013/0100542 | A1* | 4/2013 | Tsai | ................... | G02B 13/0045 359/714 |
| 2015/0160434 | A1* | 6/2015 | Chen | ................... | G02B 13/0015 359/740 |
| 2015/0253537 | A1* | 9/2015 | Ye | ....................... | G02B 13/0045 359/763 |
| 2015/0253538 | A1* | 9/2015 | Ye | ....................... | H04N 5/2254 359/764 |
| 2015/0253539 | A1* | 9/2015 | Ye | ....................... | H04N 5/2252 359/764 |
| 2015/0301308 | A1* | 10/2015 | Chen | ..................... | G02B 13/18 359/764 |
| 2015/0301309 | A1* | 10/2015 | Chen | ..................... | G02B 7/021 359/763 |
| 2015/0355438 | A1* | 12/2015 | Tang | ....................... | G02B 9/60 359/714 |

* cited by examiner

*Primary Examiner* — Evelyn A Lester
(74) *Attorney, Agent, or Firm* — W&G Law Group

(57) ABSTRACT

The present disclosure relates to a camera lens including five lenses, and having good optical characteristics and a narrow angle. The camera lens satisfies specified conditions and includes, in an order from an object side to an image side, a first lens with a positive refractive power, a second lens with a negative refractive power, a third lens with a positive refractive power, a fourth lens with a positive refractive power and a fifth lens with a negative refractive power.

2 Claims, 7 Drawing Sheets

CAMERA LENS

TECHNICAL FIELD

The present disclosure generally relates to a camera lens, and in particular to a camera lens suitable for a portable modular camera and a WEB camera and the like including CCD, CMOS and other imaging elements with high pixels. The camera is formed by five narrow-angle lenses having good optical characteristics and a full vision angle (set to 2ω below) less than 15.5°.

BACKGROUND

In recent years, various camera apparatuses having imaging elements such as CCD or CMOS are widely applied. Along with miniaturization and high performance of such imaging elements, camera lenses with good optical characteristics is demanded. In order to obtain better optical characteristics, the lens that is traditionally equipped in camera apparatuses adopts a three-piece or four-piece lens structure. Also, with the development of technology and the increase of the diverse demands of users, and as the requirement of the system on the imaging quality is improving constantly, the five-piece structure gradually appear in lens designs.

With continuous development of technology relating to camera lenses having five lenses, there is an urgent need for camera lenses with narrow angle and good optical characteristics.

SUMMARY

The objective of the present disclosure is to provide a camera lens which is formed by five lenses and has good optical characteristics at a narrow angle.

To achieve the above objective, a first lens with a positive refractive power, a second lens with a negative refractive power, a third lens with a positive refractive power, a fourth lens with a positive refractive power, and a fifth lens with a negative refractive power are configured in sequence from an object side. Further, extensive research is conducted for a ratio of a sum of a focal length of the first lens, a focal length of the third lens and a focal length of the fourth lens, and a focal length of a cameral lens, a ratio of a sum of a focal length of the second lens and a focal length of the fifth lens, and the focal length of the camera lens, a ratio of the focal length of the third lens and the focal length of the camera lens, a ratio of a curvature radius of object side surface of the third lens and a curvature radius of image side surface of the third lens, a ratio of a thickness on-axis of the fourth lens and the focal length of the camera lens, and a ratio of a thickness on-axis of the fifth lens and the focal length of the camera lens. The result shows that an improved camera lens is obtained, thereby realizing the present disclosure.

In one example, the first lens with the positive refractive power, the second lens with the negative refractive power, the third lens with the positive refractive power, the fourth lens with the positive refractive power, and the fifth lens with the negative refractive power are configured in a sequence from an object side on the camera lens, which satisfies the following conditions (1)-(6):

$$1.40 \leq (f1+f3+f4)/f \leq 2.15 \quad (1)$$

$$-1.70 \leq (f2+f5)/f \leq -0.50 \quad (2)$$

$$0.50 \leq f3/f \leq 1.30 \quad (3)$$

$$0.55 \leq R5/R6 \leq 1.00 \quad (4)$$

$$0.040 \leq d7/f \leq 0.100 \quad (5)$$

$$0.010 \leq d9/f \leq 0.030 \quad (6)$$

In the conditions:
f: the focal length of the camera lens;
f1: the focal length of the first lens;
f2: the focal length of the second lens;
f3: the focal length of the third lens;
f4: the focal length of the fourth lens;
f5: the focal length of the fifth lens;
R5: the curvature radius of object side surface of the third lens;
R6: the curvature radius of image side surface of the third lens;
d7: the thickness on-axis of the fourth lens; and
d9: the thickness on-axis of the fifth lens.

In one example, the camera lens satisfies the following condition (7):

$$-0.40 \leq f2/f \leq -0.20 \quad (7).$$

Specifically, the present disclosure can provide a camera lens including five lenses, and having a narrow angle and good optical characteristics. This camera lens is suitable for portable modular cameras and Web cameras and so on having imaging elements such as CCD and CMOS with high pixels.

SYMBOL DESCRIPTIONS

LA: the camera lens;
STOP: an aperture
L1: the first lens L1;
L2: the second lens L2;
L3: the third lens L3;
L4: the fourth lens L4;
L5: the fifth lens L5;
GF: a glass plate;
R: the curvature radius of an optical surface, a central curvature radius in a case of lens;
R1: the curvature radius of object side surface of the first lens L1;
R2: the curvature radius of image side surface of the first lens L1;
R3: the curvature radius of object side surface of the second lens L2;
R4: the curvature radius of image side surface of the second lens L2;
R5: the curvature radius of object side surface of the third lens L3;
R6: the curvature radius of image side surface of the third lens L3;
R7: the curvature radius of object side surface of the fourth lens L4;
R8: the curvature radius of image side surface of the fourth lens L4;
R9: the curvature radius of object side surface of the fifth lens L5;
R10: the curvature radius of image side surface of the fifth lens L5;
R11: the curvature radius of object side surface of the glass plate GF;
R12: the curvature radius of image side surface of the glass plate GF;
d: the thickness on-axis of the lens or a distance between lenses;
d1: the thickness on-axis of the first lens L1;
d2: the distance on-axis from image side surface of the first lens L1 to object side surface of the second lens L2;
d3: the thickness on-axis of the second lens L2;
d4: the distance on-axis from image side surface of the second lens L2 to object side surface of the third lens L3;
d5: the thickness on-axis of the third lens L3;
d6: the distance on-axis from image side surface of the third lens L3 to object side surface of the fourth lens L4;
d7: the thickness on-axis of the fourth lens L4;
d8: the distance on-axis from the image side surface of the fourth lens L4 to the object side surface of the fifth lens L5;
d9: the thickness on-axis of the fifth lens L5;
d10: the distance on-axis from image side surface of the fifth lens L5 to object side surface of the glass plate GF;
d11: the thickness on-axis of the glass plate GF;
d12: the distance on-axis from image side surface of the glass plate GF to image surface;
nd: the refractive index of the d line;
nd1: the refractive index of the d line of the first lens L1;
nd2: the refractive index of the d line of the second lens L2;
nd3: the refractive index of the d line of the third lens L3;
nd4: the refractive index of the d line of the fourth lens L4;
nd5: the refractive index of the d line of the fifth lens L5;
nd6: the refractive index of the d line of the glass plate GF;
v: the abbe number
v1: the abbe number of the first lens L1;
v2: the abbe number of the second lens L2;
v3: the abbe number of the third lens L3;
v4: the abbe number of the fourth lens L4;
v5: the abbe number of the fifth lens L5;
v6: the abbe number of the glass plate GF;

DETAILED DESCRIPTION OF THE EMBODIMENTS

Figure 1:
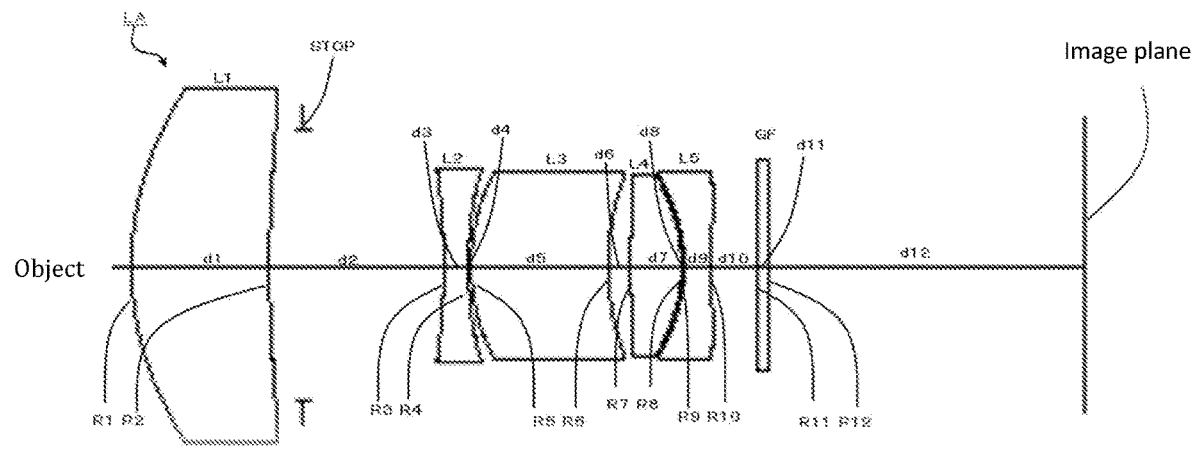
FIG. 1 is a schematic diagram illustrating a structure of a camera lens LA according to an example of the present invention.

The examples of the camera lens of the present disclosure will be described below with reference to the accompanying drawings. The camera lens LA according to some examples of the present disclosure has a structure shown in FIG. 1. The camera lens LA includes a first lens L1, a second lens L2, a third lens L3, a fourth lens L4 and a fifth lens L5 configured in a sequence from an object side to an image side. A glass plate GF is configured between the fifth lens and an image surface. The glass plate GF may be a cover glass or a glass plate GF with functions of an IR cut filter. Optionally, the glass plate GF configured between the fifth lens L5 and the image surface can also be omitted.

The first lens L1 is a lens with a positive refractive power, the second lens L2 is a lens with a negative refractive power, the third lens L3 is a lens with a positive refractive power, the fourth lens L4 is a lens with a positive refractive power and the fifth lens L5 is a lens with a negative refractive power. To correct kinds of aberrations well, all lens surfaces of the five lenses are ideally configured to aspherical surfaces.

The camera lens LA satisfies the following conditions (1)-(6):

$$1.40 \leq (f1+f3+f4)/f \leq 2.15 \tag{1};$$

$$-1.70 \leq (f2+f5)/f \leq -0.50 \tag{2};$$

$$0.50 \leq f3/f \leq 1.30 \tag{3};$$

$$0.55 \leq R5/R6 \leq 1.00 \tag{4};$$

$$0.040 \leq d7/f \leq 0.100 \tag{5};$$

$$0.010 \leq d9/f \leq 0.030 \tag{6}.$$

In the conditions, f: the focal length of the cameral lens;
f1: the focal length of the first lens;
f2: the focal length of the second lens;
f3: the focal length of the third lens;
f4: the focal length of the fourth lens;
f5: the focal length of the fifth lens;
R5: the curvature radius of object side surface of the third lens;
R6: the curvature radius of image side surface of the third lens;
d7: the thickness on-axis of the fourth lens;
d9: the thickness on-axis of the fifth lens;

The condition (1) specifies a ratio of a sum of the focal length f1 of the first lens L1, the focal length f3 of the third lens L3 and the focal length f4 of the fourth lens L4, and the focal length f of the camera lens. In a case of outside the range of the condition (1), it is difficult to realize a narrow angle with good optical characteristics. Therefore, it is not preferred.

The condition (2) specifies a ratio of a sum of the focal length f2 of the second lens L2 and the focal length f5 of the fifth lens L5, and the focal length f of the camera lens. In a case of outside the range of the condition (2), it is difficult to realize a narrow angle with good optical characteristics and therefore it is not preferred.

The condition (3) specifies a ratio of the focal length f3 of the third lens L3 and the focal length f of the camera lens. In a case of outside the range of the condition (3), it is difficult to realize a narrow angle with good optical characteristics and therefore it is not preferred.

The condition (4) specifies a ratio of the curvature radius R5 of object side surface of the third lens L3 and the curvature radius R6 of image side surface of the third lens L3. In a case of outside the range of the condition (4), it is difficult to realize a narrow angle with good optical characteristics and therefore it is not preferred.

The condition (5) specifies a ratio of the thickness on-axis d7 of the fourth lens L4 and the focal length f of the camera lens. In a case of outside the range of the condition (5), it is difficult to realize a narrow angle with good optical characteristics and therefore it is not preferred.

The condition (6) specifies a ratio of the thickness on-axis d9 of the fifth lens L5 and the focal length f of the camera lens. In a case of outside the range of the condition (6), it is difficult to realize a narrow angle with good optical characteristics and therefore it is not preferred.

The second lens L2 is a lens of a negative refractive power satisfying the following condition (7).

$$-0.40 \leq f2/f \leq -0.20 \quad (7).$$

The condition (7) specifies a ratio range of the focal length f2 of the second lens L2 and the focal length f of the camera lens, which facilitate realizing a narrow angle with good optical characteristics.

When the five lenses forming the camera lens LA satisfy the above structures and conditions respectively, a narrow-angle camera lens with good optical characteristics can be obtained.

Examples f: the focal length of the camera lens LA;
f1: the focal length of the first lens L1;
f2: the focal length of the second lens L2;
f3: the focal length of the third lens L3;
f4: the focal length of the fourth lens L4;
f5: the focal length of the fifth lens L5;
Fno: F number;
2ω: a full vision angle
STOP: the aperture
R: a curvature radius of an optical surface, a central curvature radius in a case of lens;
R1: the curvature radius of object side surface of the first lens L1;
R2: the curvature radius of image side surface of the first lens L1;
R3: the curvature radius of object side surface of the second lens L2;
R4: the curvature radius of image side surface of the second lens L2;
R5: the curvature radius of object side surface of the third lens L3;
R6: the curvature radius of image side surface of the third lens L3;
R7: the curvature radius of object side surface of the fourth lens L4;
R8: the curvature radius of image side surface of the fourth lens L4;
R9: the curvature radius of object side surface of the fifth lens L5;
R10: the curvature radius of image side surface of the fifth lens L5;
R11: the curvature radius of object side surface of the glass plate GF;
R12: the curvature radius of image side surface of the glass plate GF;
d: the thickness on-axis of the lens, or a distance between lenses;
d1: the thickness on-axis of the first lens L1;
d2: the distance on-axis from image side surface of the first lens L1 to object side surface of the second lens L2;
d3: the thickness on-axis of the second lens L2;
d4: the distance on-axis from image side surface of the second lens L2 to object side surface of the third lens L3;
d5: the thickness on-axis of the third lens L3;
d6: the distance on-axis from image side surface of the third lens L3 to object side surface of the fourth lens L4;
d7: the thickness on-axis of the fourth lens L4;
d8: the distance on-axis from image side surface of the fourth lens L4 to object side surface of the fifth lens L5;
d9: the thickness on-axis of the fifth lens L5;
d10: the distance on-axis from image side surface of the fifth lens L5 to object side surface of the glass plate GF;
d11: the thickness on-axis of the glass plate GF;
d12: the distance on-axis from image side surface of the glass plate GF to the image surface;
nd: the refractive index of the d line;
nd1: the refractive index of the d line of the first lens L1;
nd2: the refractive index of the d line of the second lens L2;
nd3: the refractive index of the d line of the third lens L3;
nd4: the refractive index of the d line of the fourth lens L4;
nd5: the refractive index of the d line of the fifth lens L5;
nd6: the refractive index of the d line of the sixth lens L6;
vd: The abbe number
v1: the abbe number of the first lens L1;
v2: the abbe number of the second lens L2;
v3: the abbe number of the third lens L3;
v4: the abbe number of the fourth lens L4;
v5: the abbe number of the fifth lens L5;
v6: the abbe number of the glass plate GF;
TTL: total optical length (the distance on-axis from the object side surface of the first lens L1 to the image surface);

LB: the distance on-axis from the image side surface of the fifth lens L5 to the image surface (including the thickness of the glass plate GF);

IH: the image height;

$$y=(x^2/R)/[1+\{1-(k+1)(x^2/R^2)\}^{1/2}]+A4x^4+A6x^6+A8x^8+A10x^{10}+A12x^{12}+A14x^{14} \quad (8)$$

R is the curvature radius on-axis, k is a conic index and A4, A6, A8, A10, A12, and A14 are aspherical indexes.

For the sake of convenience, the aspherical surface of each lens is the aspherical surface shown in the above condition (8). However, the present disclosure is not limited to the aspherical polynomial forms in the condition (8).

Example 1

Figure 2:
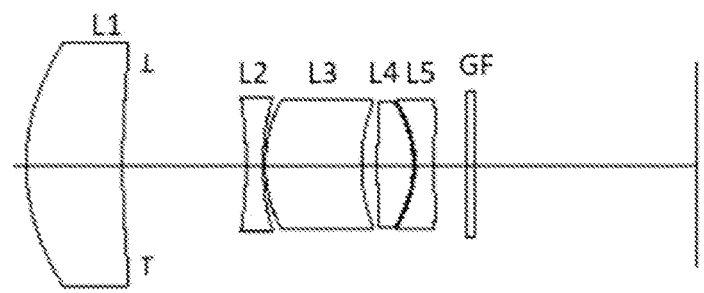
FIG. 2 is a schematic diagram illustrating a structure of an example 1 of the above camera lens LA.

FIG. 2 is a schematic diagram illustrating a structure of the camera lens LA of the example 1. For the first to fifth lenses L1-L5 of the camera lens LA in the example 1, the curvature radiuses R of different object sides and image sides, the thicknesses on-axis of lenses or the distances d between lenses, the refractive indexes nd, and the abbe numbers ν are shown in Table 1, the conic indexes k and the aspherical indexes are shown in Table 2 and 2ω, Fno, f, f1, f2, f3, f4, f5, TTL, LB, IH are shown in Table 3. The mm in the following tables refers to millimeter.

TABLE 1

|  | R (mm) | d (mm) | nd |  | νd | Valid radius (mm) |
|---|---|---|---|---|---|---|
| R1 | 5.3832 | d1 2.500 | nd1 1.5831 | v1 | 59.39 | 3.158 |
| R2 | 21.7182 | d2 0.633 |  |  |  | 2.648 |
| STOP | Infinity | 2.553 |  |  |  | 2.382 |
| R3 | −6.6190 | d3 0.441 | nd2 1.6713 | v2 | 19.24 | 1.700 |
| R4 | 8.4028 | d4 0.050 |  |  |  | 1.669 |
| R5 | 3.1829 | d5 2.500 | nd3 1.5445 | v3 | 55.99 | 1.660 |
| R6 | 4.7509 | d6 0.401 |  |  |  | 1.574 |
| R7 | 12.3914 | d7 0.916 | nd4 1.6150 | v4 | 25.92 | 1.600 |
| R8 | −3.1920 | d8 0.057 |  |  |  | 1.610 |
| R9 | −3.1774 | d9 0.500 | nd5 1.5445 | v5 | 55.99 | 1.634 |
| R10 | 21.1769 | d10 0.800 |  |  |  | 1.680 |
| R13 | Infinity | d13 0.210 | nd7 1.5168 | v7 | 64.17 | 1.829 |
| R14 | Infinity | d14 5.762 |  |  |  | 1.848 |

TABLE 2

|  | Conic index | aspherical index | | | | | |
|---|---|---|---|---|---|---|---|
|  | k | A4 | A6 | A8 | A10 | A12 | A14 |
| R1 | 0.0000E+00 | −1.3210E−05 | −3.1004E−05 | −1.4656E−06 | 0.0000E+00 | 0.0000E+00 | 0.0000E+00 |
| R2 | 0.0000E+00 | 4.4857E−04 | −2.0018E−04 | 8.1278E−06 | 0.0000E+00 | 0.0000E+00 | 0.0000E+00 |
| R3 | 0.0000E+00 | 3.6851E−02 | −2.3629E−02 | 1.1555E−02 | −4.1595E−03 | 8.9525E−04 | −7.9559E−05 |
| R4 | 0.0000E+00 | 1.4282E−03 | 1.9392E−02 | −1.1086E−02 | 1.3609E−03 | 3.4644E−04 | −6.5173E−05 |
| R5 | 0.0000E+00 | −4.8610E−02 | 5.4635E−02 | −2.9567E−02 | 8.2089E−03 | −1.1991E−03 | 8.0886E−05 |
| R6 | 0.0000E+00 | −1.6200E−02 | 1.1886E−02 | 4.2604E−03 | −4.2081E−02 | 9.1120E−04 | −6.2104E−05 |
| R7 | 0.0000E+00 | −1.5654E−02 | −3.2770E−03 | 1.1585E−02 | −6.0479E−03 | 1.1384E−03 | −7.1521E−05 |
| R8 | −3.4576E−01 | −7.3544E−03 | −4.6987E−02 | 6.3636E−02 | −3.0669E−02 | 5.8239E−03 | −2.8329E−04 |
| R9 | 0.0000E+00 | −1.7350E−02 | −4.4770E−02 | 7.3636E−02 | −3.8437E−02 | 7.9357E−03 | −4.6485E−04 |
| R10 | 3.9910E+01 | −1.4998E−02 | 1.0836E−03 | 4.0597E−03 | −2.7555E−03 | 6.3867E−04 | −4.7988E−05 |

TABLE 3

| 2ω (°) | 15.39 |
| Fno | 3.30 |
| f (mm) | 19.154 |
| f1 (mm) | 11.619 |
| f2 (mm) | −5.451 |
| f3 (mm) | 11.339 |

TABLE 3-continued

| f4 (mm) | 4.221 |
| f5 (mm) | −5.038 |
| TTL (mm) | 17.323 |
| LB (mm) | 6.772 |
| IH (mm) | 2.619 |

Table 16 mentioned below refers to values corresponding to parameters specified in the conditions (1)-(7) in the examples 1-5.

As shown in Table 16, the example 1 satisfies the conditions (1)-(7).

Figure 3:
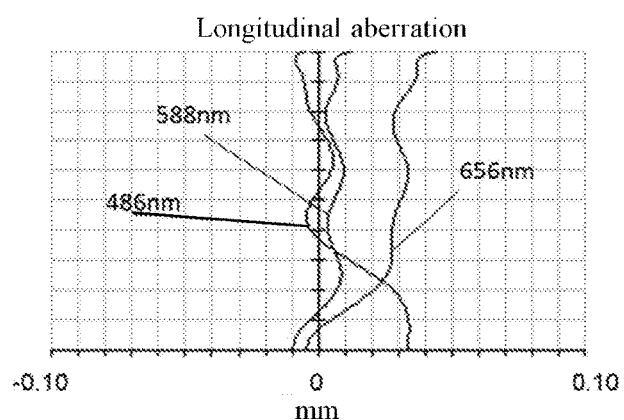
FIG. 3 is a schematic diagram illustrating a longitudinal aberration of the camera lens LA according to the example 1 of the present invention.
Figure 4:
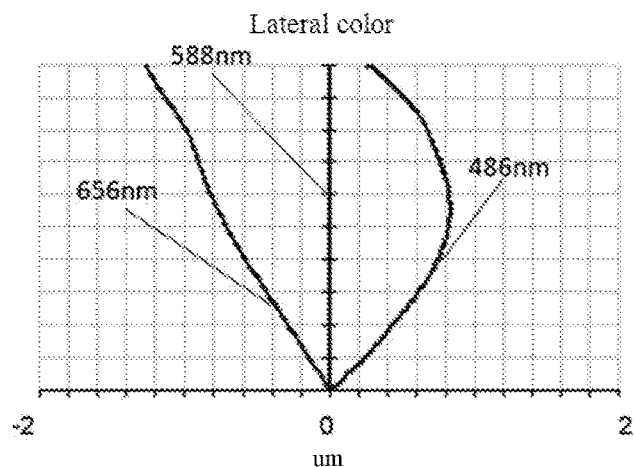
FIG. 4 is a schematic diagram illustrating a lateral color of the camera lens LA of the example 1.
Figure 5:
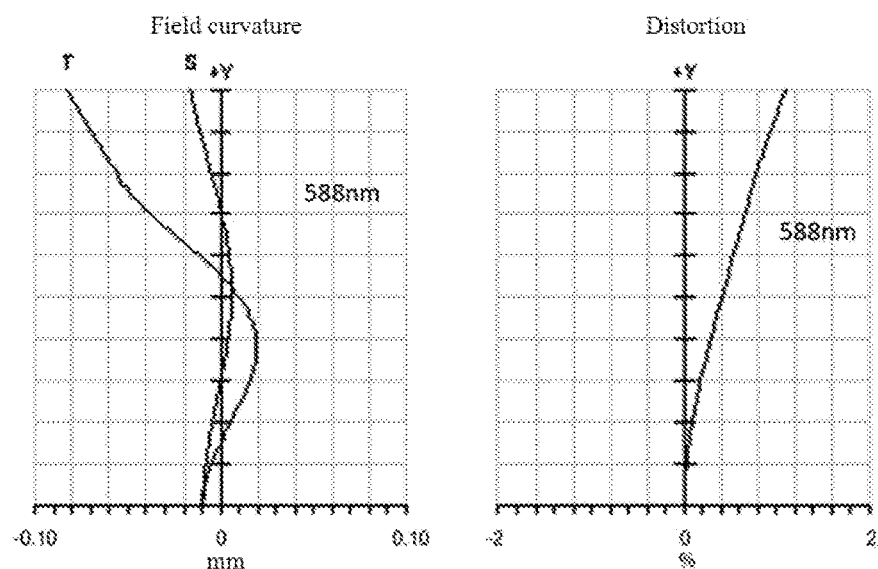
FIG. 5 is a schematic diagram illustrating a field curvature and a distortion of the camera lens LA of the example 1.

The longitudinal aberration of the camera lens LA of the example 1 is shown in FIG. 3, the lateral color is shown in FIG. 4 and the field curvature and the distortion are shown in FIG. 5. Further, the field curvature S of FIG. 5 is a field curvature in a sagittal direction, and T refers to a field curvature in a meridian direction, which are same as shown in examples 2-5. As shown in Table 3, the camera lens LA of the example 1 has good optical characteristics at a narrow angle as shown in FIGS. 3-5.

Example 2

Figure 6:
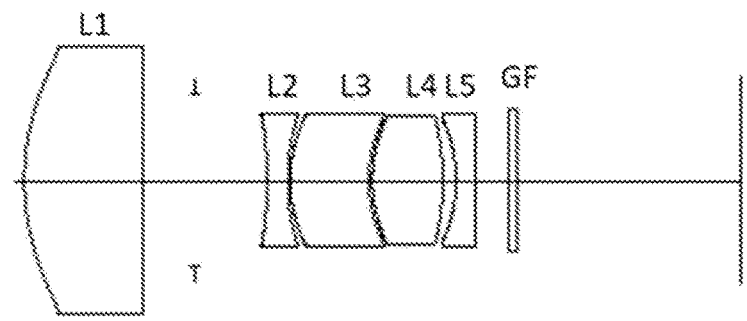
FIG. 6 is a schematic diagram illustrating a structure of an example 2 of the above camera lens LA.

FIG. 6 is a schematic diagram illustrating a structure of the camera lens LA of the example 2. For the first to fifth lenses L1-L5 of the camera lens LA in the example 2, the curvature radiuses R of different object side and image sides, the thickness on-axis of lenses or distances d between lenses, the refractive indexes nd, and the abbe numbers ν are shown in Table 4, the conic indexes k and the aspherical indexes are shown in Table 5 and 2ω, Fno, f, f1, f2, 0, f4, f5, TTL, LB, IH are shown in Table 6.

TABLE 4

|  | R (mm) | d (mm) | nd |  | νd | Valid radius (mm) |
|---|---|---|---|---|---|---|
| R1 | 6.2280 | d1 3.000 | nd1 1.5831 | v1 | 59.39 | 3.367 |
| R2 | 49.0256 | d2 1.335 |  |  |  | 2.833 |
| STOP | Infinity | 1.827 |  |  |  | 2.158 |

TABLE 4-continued

|  | R (mm) | d (mm) | nd |  | νd | Valid radius (mm) |
|---|---|---|---|---|---|---|
| R3 | −6.0610 | d3 0.518 | nd2 1.6713 | v2 | 19.24 | 1.700 |
| R4 | 6.8200 | d4 0.056 |  |  |  | 1.658 |

TABLE 4-continued

Figure 7:
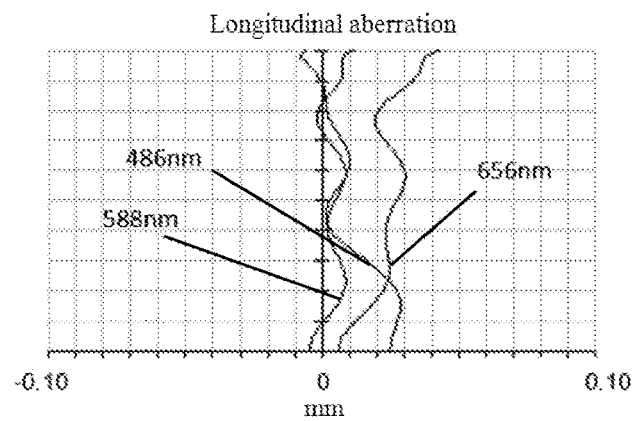
FIG. 7 is a schematic diagram illustrating a longitudinal aberration of the camera lens LA according to the example 2 of the present invention.
Figure 8:
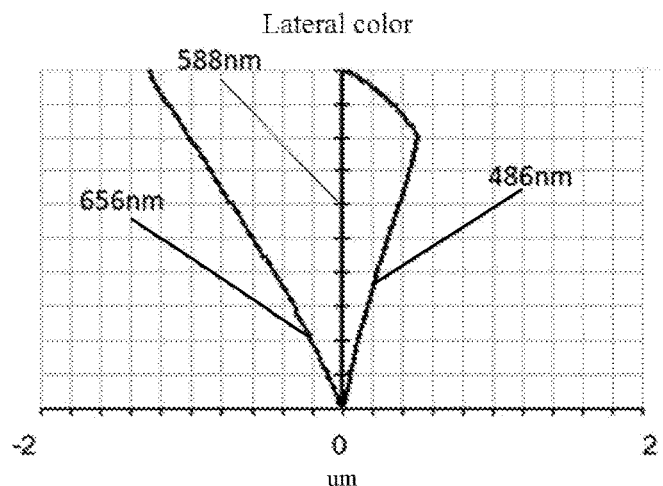
FIG. 8 is a schematic diagram illustrating a lateral color of the camera lens LA according to the example 2 of the present invention.
Figure 9:
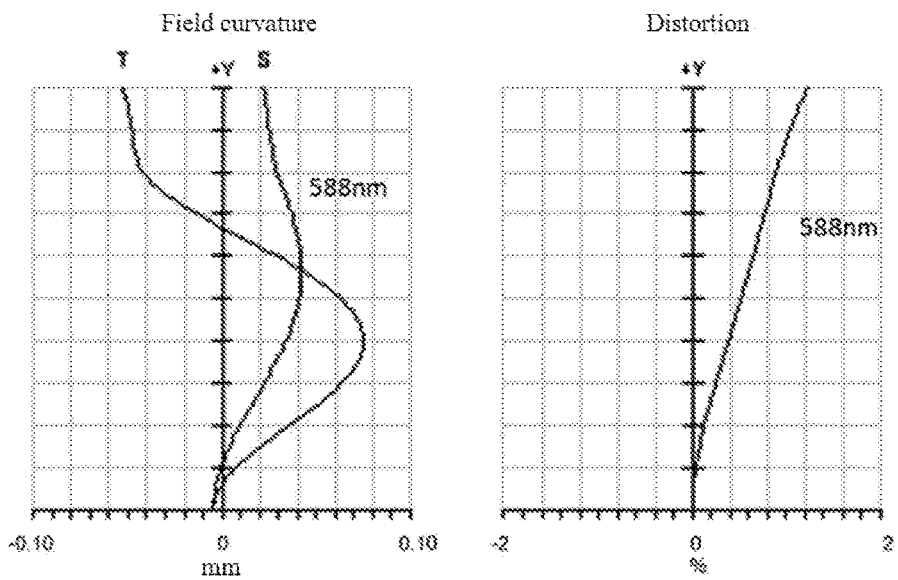
FIG. 9 is a schematic diagram illustrating a field curvature and a distortion of the camera lens LA according to the example 2 of the present invention.

| | R (mm) | d (mm) | nd | vd | Valid radius (mm) |
|---|---|---|---|---|---|
| R5 | 3.1929 | d5 2.000 nd3 | 1.5445 | v3 55.99 | 1.660 |
| R6 | 3.2923 | d6 0.080 | | | 1.629 |
| R7 | 3.5453 | d7 1.800 nd4 | 1.6150 | v4 25.92 | 1.653 |
| R8 | −5.9064 | d8 0.334 | | | 1.610 |
| R9 | −3.6708 | d9 0.500 nd5 | 1.5445 | v5 55.99 | 1.579 |
| R10 | 112.6758 | d10 0.800 | | | 1.680 |
| R13 | Infinity | d13 0.210 nd7 | 1.5168 | v7 64.17 | 1.762 |
| R14 | Infinity | d14 5.703 | | | 1.783 | shown in FIG. 9. As shown in Table 6, the camera lens LA of the example 2 has good optical characteristics at a narrow angle as shown in FIGS. 7-9.

Example 3

Figure 10:
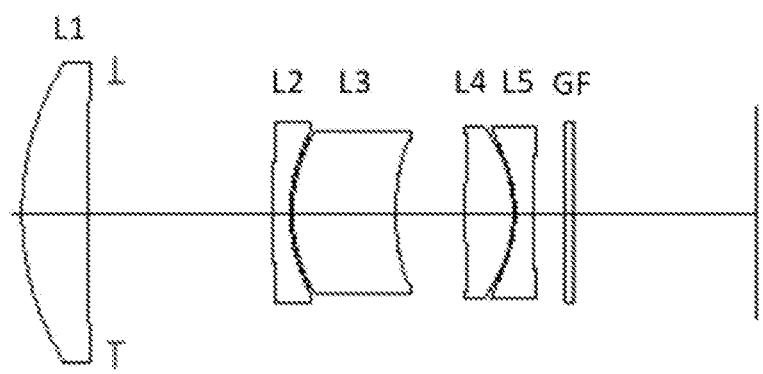
FIG. 10 is a schematic diagram illustrating a structure of an example 3 of the above camera lens LA.

FIG. 10 is a schematic diagram illustrating a structure of the camera lens LA of the example 3. For the first to fifth lenses L1-L5 of the camera lens LA in the example 3, the curvature radiuses R of different object side and image sides, thickness on-axis of lenses or distances d between lenses, the refractive indexes nd, the abbe numbers v are shown in Table 7, the conic indexes k and the aspherical indexes are shown in Table 8 and 2ω, Fno, f, f1, f2, f3, f4, f5, TTL, LB, IH are shown in Table 9.

TABLE 5

| | Conic index | aspherical index | | | | | |
|---|---|---|---|---|---|---|---|
| | k | A4 | A6 | A8 | A10 | A12 | A14 |
| R1 | 0.0000E+00 | −2.4573E−04 | −2.3619E−05 | −2.2356E−06 | 0.0000E+00 | 0.0000E+00 | 0.0000E+00 |
| R2 | 0.0000E+00 | −1.2507E−04 | −1.9404E−04 | 6.9826E−06 | 0.0000E+00 | 0.0000E+00 | 0.0000E+00 |
| R3 | 0.0000E+00 | 4.1561E−02 | −3.0326E−02 | 1.4867E−02 | −4.9911E−03 | 9.8377E−04 | −8.1257E−05 |
| R4 | 0.0000E+00 | 2.3840E−02 | −1.9210E−02 | 1.4303E−02 | −7.1542E−03 | 1.7318E−03 | −1.4938E−04 |
| R5 | 0.0000E+00 | −2.8673E−02 | 1.4780E−02 | −6.7866E−04 | −2.3425E−03 | 7.2188E−04 | −5.7398E−05 |
| R6 | 0.0000E+00 | −1.5348E−02 | 5.4533E−03 | 7.1885E−04 | −1.0018E−03 | 1.9440E−04 | −1.1297E−05 |
| R7 | 0.0000E+00 | −1.0561E−03 | −1.2763E−03 | 4.4811E−04 | −5.8909E−05 | 3.3389E−06 | −6.8146E−08 |
| R8 | −5.2532E+00 | 1.0550E−02 | −4.8672E−03 | −3.1453E−03 | 2.5245E−03 | −5.3954E−04 | 3.8563E−05 |
| R9 | 0.0000E+00 | 8.8046E−03 | −3.8403E−03 | −1.0021E−02 | 1.0146E−02 | −3.6234E−03 | 4.6448E−04 |
| R10 | 8.9311E+01 | 3.1166E−03 | −1.1844E−02 | 9.6599E−03 | −3.6779E−03 | 6.4989E−04 | −4.1728E−05 |

TABLE 6

| 2ω (°) | 15.36 |
|---|---|
| Fno | 3.30 |
| f (mm) | 19.176 |
| f1 (mm) | 11.927 |
| f2 (mm) | −4.704 |
| f3 (mm) | 23.998 |
| f4 (mm) | 3.884 |
| f5 (mm) | −6.519 |
| TTL (mm) | 18.163 |
| LB (mm) | 6.713 |
| IH (mm) | 2.619 |

As shown in Table 16, the example 2 satisfies the conditions (1)-(7).

The longitudinal aberration of the camera lens LA of the example 2 is as shown in FIG. 7, the lateral color is as shown in FIG. 8 and the field curvature and the distortion are as

TABLE 7

| | R (mm) | d (mm) | nd | vd | Valid radius (mm) |
|---|---|---|---|---|---|
| R1 | 7.1014 | d1 1.635 nd1 | 1.5831 | v1 59.39 | 3.739 |
| R2 | 187.6223 | d2 0.696 | | | 3.564 |
| STOP | Infinity | 3.943 | | | 3.249 |
| R3 | −20.2200 | d3 0.421 nd2 | 1.6713 | v2 19.24 | 2.231 |
| R4 | 6.8171 | d4 0.050 | | | 2.090 |
| R5 | 4.1935 | d5 2.558 nd3 | 1.5445 | v3 55.99 | 2.051 |
| R6 | 5.8334 | d6 1.726 | | | 1.831 |
| R7 | 16.5112 | d7 1.193 nd4 | 1.6150 | v4 25.92 | 2.020 |
| R8 | −4.0286 | d8 0.050 | | | 2.147 |
| R9 | −3.9286 | d9 0.450 nd5 | 1.5445 | v5 55.99 | 2.128 |
| R10 | 19.5768 | d10 0.800 | | | 2.148 |
| R13 | Infinity | d13 0.210 nd7 | 1.5168 | v7 64.17 | 2.211 |
| R14 | Infinity | d14 4.548 | | | 2.223 |

TABLE 8

| | Conic index | aspherical index | | | | | |
|---|---|---|---|---|---|---|---|
| | k | A4 | A6 | A8 | A10 | A12 | A14 |
| R1 | 0.0000E+00 | −2.0123E−05 | 9.7342E−07 | −3.0900E−08 | 0.0000E+00 | 0.0000E+00 | 0.0000E+00 |
| R2 | 0.0000E+00 | 3.2596E−04 | −5.4355E−06 | 4.5312E−08 | 0.0000E+00 | 0.0000E+00 | 0.0000E+00 |
| R3 | 0.0000E+00 | 2.5804E−02 | −7.7186E−03 | 1.2008E−03 | −7.2527E−05 | −4.6726E−06 | 6.1092E−07 |
| R4 | 0.0000E+00 | 2.2894E−02 | 1.9566E−03 | −5.5039E−03 | 2.1376E−03 | −3.5489E−04 | 2.1483E−05 |
| R5 | 0.0000E+00 | −6.2052E−03 | 1.0670E−02 | −6.7816E−03 | 2.1963E−03 | −3.4020E−04 | 1.9613E−05 |
| R6 | 0.0000E+00 | −2.3604E−03 | 2.1148E−03 | −3.6349E−05 | −6.5045E−05 | 5.6013E−05 | −7.8989E−06 |
| R7 | 0.0000E+00 | −7.2766E−03 | 1.6612E−03 | −1.2480E−03 | 5.0487E−04 | −1.1178E−04 | 9.7921E−06 |
| R8 | 1.3096E+00 | −2.9148E−02 | 2.5603E−02 | −1.2084E−02 | 3.3382E−03 | −4.9705E−04 | 3.1405E−05 |

TABLE 8-continued

| | Conic index | aspherical index | | | | | |
|---|---|---|---|---|---|---|---|
| | k | A4 | A6 | A8 | A10 | A12 | A14 |
| R9 | 0.0000E+00 | −3.5248E−02 | 3.3031E−02 | −1.5531E−02 | 4.2240E−03 | −6.0804E−04 | 3.6994E−05 |
| R10 | 7.2624E+01 | −7.0555E−03 | 3.5964E−03 | −1.6877E−03 | 4.1168E−04 | −4.9432E−05 | 2.0595E−06 |

TABLE 9

| | |
|---|---|
| 2ω (°) | 14.74 |
| Fno | 2.80 |
| f (mm) | 20.094 |
| f1 (mm) | 12.615 |
| f2 (mm) | −7.547 |
| f3 (mm) | 17.676 |
| f4 (mm) | 5.385 |
| f5 (mm) | −5.969 |
| TTL (mm) | 18.280 |
| LB (mm) | 5.558 |
| IH (mm) | 2.619 |

As shown in Table 16, the example 3 satisfies the conditions (1)-(7).

Figure 11:
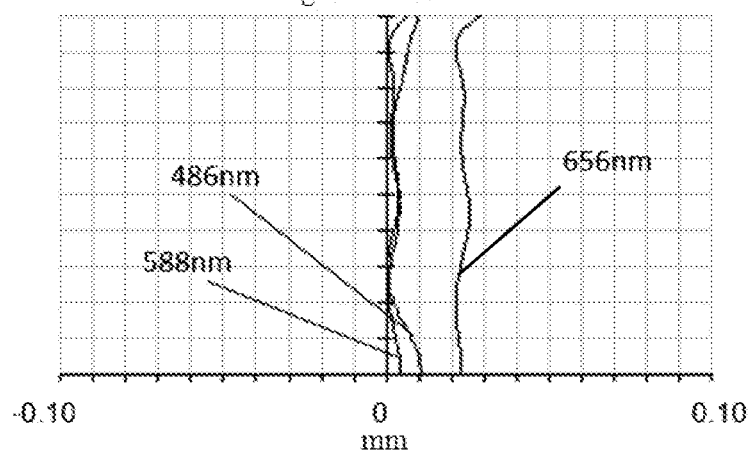
FIG. 11 is a schematic diagram illustrating a longitudinal aberration of the camera lens LA according to the example 3 of the present invention.
Figure 12:
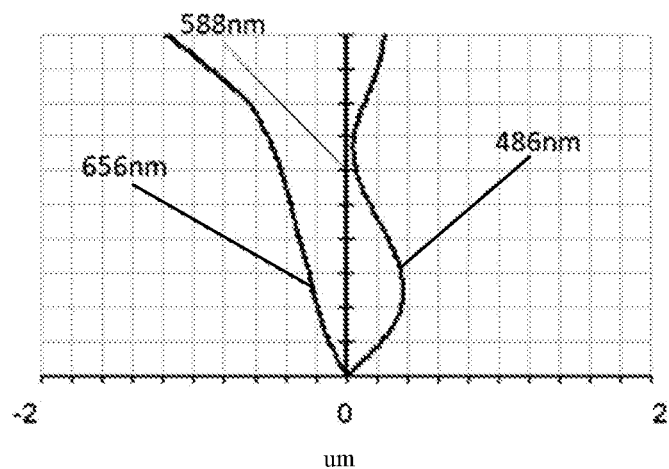
FIG. 12 is a schematic diagram illustrating a lateral color of the camera lens LA according to the example 3 of the present invention.
Figure 13:
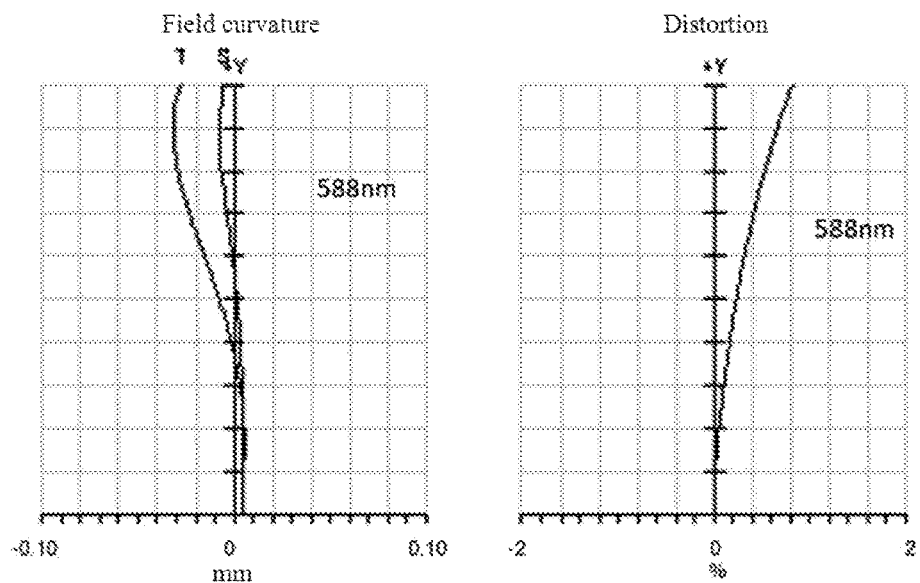
FIG. 13 is a schematic diagram illustrating a field curvature and a distortion of the camera lens LA according to the example 3 of the present invention.

The longitudinal aberration of the camera lens LA of the example 3 is shown in FIG. 11, the lateral color is shown in FIG. 12, and the field curvature and the distortion are shown in FIG. 13. As shown in Table 9, the camera lens LA of the example 3 has good optical characteristics at a narrow angle as shown in FIGS. 11-13.

Example 4

Figure 14:
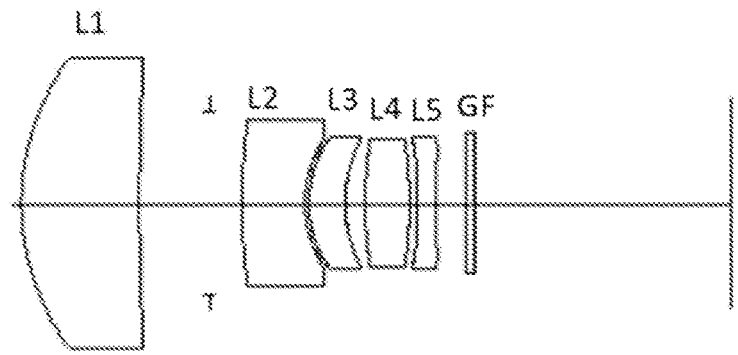
FIG. 14 is a schematic diagram illustrating a structure of an example 4 of the above camera lens LA.

FIG. 14 is a schematic diagram illustrating a structure of the camera lens LA of the example 4. For the first to fifth lenses L1-L5 of the camera lens LA in the example 4, the curvature radiuses R of different object side and image sides, thickness on-axis of lenses or distances d between lenses, the refractive indexes nd, the abbe numbers v are as shown in Table 10, the conic indexes k and the aspherical indexes are as shown in Table 11 and 2ω, Fno, f, f1, f2, 3, f4, f5, TTL, LB, IH are as shown in Table 12.

TABLE 10

| | R (mm) | d (mm) | nd | | vd | Valid radius (mm) |
|---|---|---|---|---|---|---|
| R1 | 5.9266 | d1 | 2.999 | nd1 | 1.5286 v1 76.98 | 3.711 |
| R2 | 44.8920 | d2 | 1.770 | | | 3.146 |
| STOP | Infinity | | 0.824 | | | 2.307 |
| R3 | 14.6254 | d3 | 1.600 | nd2 | 1.6613 v2 20.37 | 2.086 |
| R4 | 2.9328 | d4 | 0.103 | | | 1.629 |
| R5 | 2.8431 | d5 | 0.914 | nd3 | 1.5352 v3 56.12 | 1.644 |
| R6 | 3.4941 | d6 | 0.511 | | | 1.553 |
| R7 | 10.3101 | d7 | 1.126 | nd4 | 1.6713 v4 19.24 | 1.534 |
| R8 | −14.6011 | d8 | 0.161 | | | 1.614 |
| R9 | 16.3533 | d9 | 0.490 | nd5 | 1.5445 v5 55.99 | 1.612 |
| R10 | 7.4995 | d10 | 0.800 | | | 1.651 |
| R13 | Infinity | d13 | 0.210 | nd7 | 1.5168 v7 64.17 | 1.782 |
| R14 | Infinity | d14 | 6.492 | | | 1.800 |

TABLE 11

| | Conic index | aspherical index | | | | | |
|---|---|---|---|---|---|---|---|
| | k | A4 | A6 | A8 | A10 | A12 | A14 |
| R1 | 0.0000E+00 | −3.1327E−04 | −7.8884E−06 | −3.1676E−07 | 0.0000E+00 | 0.0000E+00 | 0.0000E+00 |
| R2 | 0.0000E+00 | −5.5231E−04 | 2.6008E−05 | −2.8528E−07 | 0.0000E+00 | 0.0000E+00 | 0.0000E+00 |
| R3 | 0.0000E+00 | −2.7494E−03 | 5.8780E−04 | −8.2839E−05 | 4.7121E−05 | −1.0575E−05 | 7.7150E−07 |
| R4 | 0.0000E+00 | −1.5718E−02 | 2.8353E−02 | −2.9765E−02 | 1.5017E−02 | −3.3756E−03 | 2.7544E−04 |
| R5 | 0.0000E+00 | −1.7921E−02 | 4.2267E−02 | −4.2485E−02 | 1.9769E−02 | −4.1756E−03 | 3.2027E−04 |
| R6 | 0.0000E+00 | −1.4853E−02 | 3.3015E−02 | −2.4876E−02 | 8.7251E−03 | −1.3489E−03 | 7.5259E−05 |
| R7 | 0.0000E+00 | −1.4285E−02 | 2.1544E−02 | −1.2800E−02 | 4.4327E−03 | −1.0027E−03 | 1.3313E−04 |
| R8 | −3.6278E+01 | −3.3741E−02 | 4.0271E−02 | −2.6146E−02 | 1.0548E−02 | −2.7799E−03 | 3.4972E−04 |
| R9 | 0.0000E+00 | −6.0249E−02 | 4.6238E−02 | −2.8112E−02 | 1.0785E−02 | −2.7528E−03 | 3.3248E−04 |
| R10 | −1.4844E+01 | −2.6359E−02 | 7.6381E−03 | −2.4431E−03 | 3.7269E−04 | −2.3362E−05 | 4.7700E−07 |

TABLE 12

| | |
|---|---|
| 2ω (°) | 15.41 |
| Fno | 3.00 |
| f (mm) | 19.191 |
| f1 (mm) | 12.583 |
| f2 (mm) | −5.867 |
| f3 (mm) | 19.142 |
| f4 (mm) | 9.168 |
| f5 (mm) | −25.946 |
| TTL (mm) | 18.000 |
| LB (mm) | 7.502 |
| IH (mm) | 2.619 |

As shown in Table 16, the example 4 satisfies the conditions (1)-(7).

Figure 15:
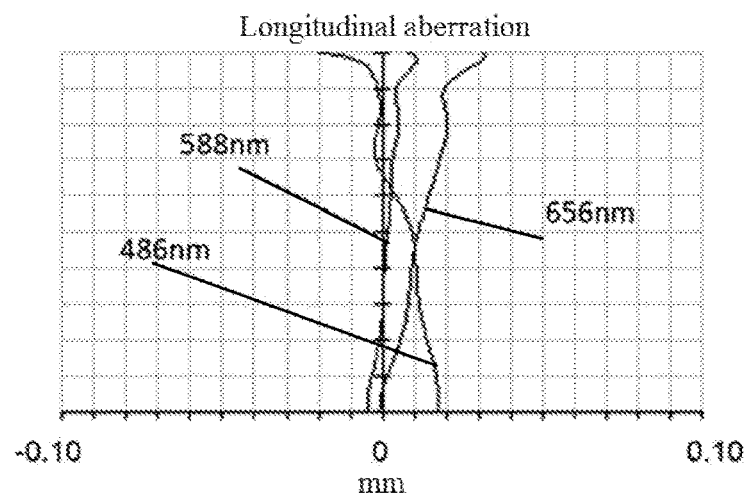
FIG. 15 is a schematic diagram illustrating a longitudinal aberration of the camera lens LA according to the example 4 of the present invention.
Figure 16:
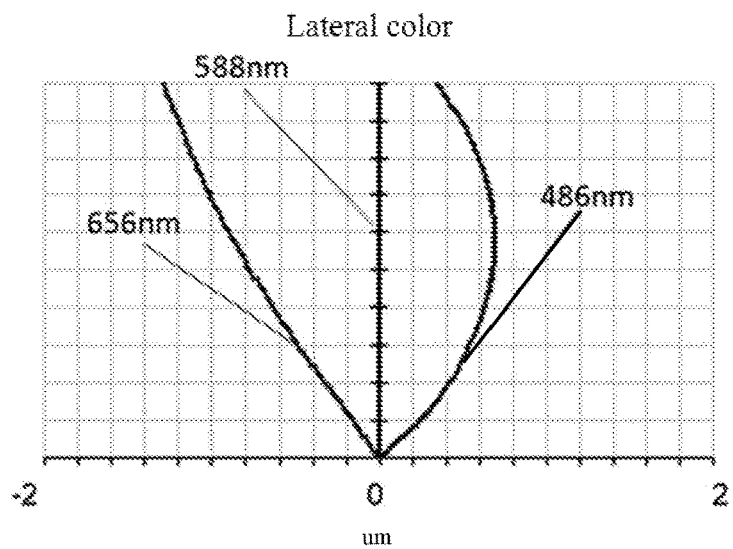
FIG. 16 is schematic diagram illustrating a lateral color of the camera lens LA according to the example 4 of the present invention.
Figure 17:
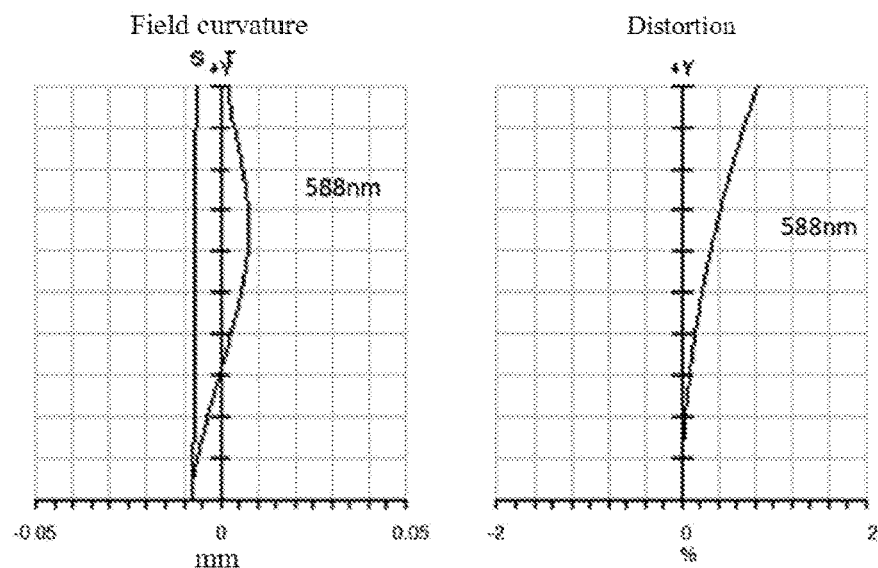
FIG. 17 is a schematic diagram illustrating a field curvature and a distortion of the camera lens LA according to the example 4 of the present invention.

The longitudinal aberration of the camera lens LA of the example 4 is shown in FIG. 15, the lateral color is shown in FIG. 16, and the field curvature and the distortion are shown in FIG. 17. As shown in Table 12, the camera lens LA of the example 4 has good optical characteristics at a narrow angle as shown in FIGS. 15-17.

Example 5

Figure 18:
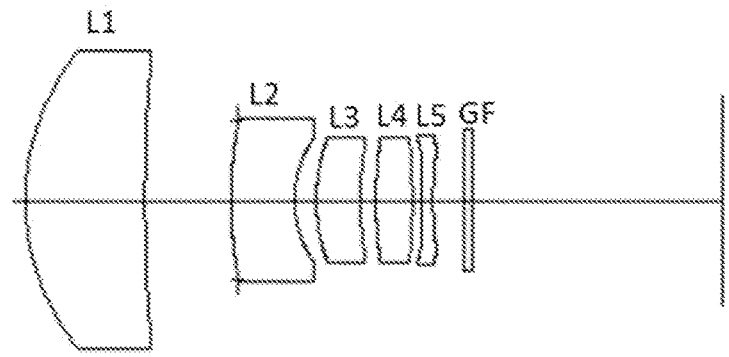
FIG. 18 is a schematic diagram illustrating a structure of an example 5 of the above camera lens LA.

FIG. 18 is a schematic diagram illustrating a structure of the camera lens LA of the example 5. For the first to fifth lenses L1-L5 of the camera lens LA in the example 5, the curvature radiuses R of different object side and image sides, thickness on-axis of lenses or distances d between lenses, the refractive indexes nd, the abbe numbers ν are shown in Table 13, the conic indexes k and the aspherical indexes are shown in Table 14 and 2ω, Fno, f, f1, f2, f3, f4, f5, TTL, LB, IH are shown in Table 15.

TABLE 13

|  | R (mm) | d (mm) |  | nd |  | νd | Valid radius (mm) |
| --- | --- | --- | --- | --- | --- | --- | --- |
| R1 | 5.6338 | d1 | 3.000 | nd1 | 1.5286 | ν1 | 76.98 | 3.753 |
| R2 | 37.1680 | d2 | 2.291 |  |  |  | 3.111 |
| STOP | Infinity |  | −0.164 |  |  |  | 2.002 |
| R3 | 8.5709 | d3 | 1.600 | nd2 | 1.6613 | ν2 | 20.37 | 2.021 |
| R4 | 2.5472 | d4 | 0.544 |  |  |  | 1.535 |
| R5 | 4.0194 | d5 | 1.101 | nd3 | 1.5352 | ν3 | 56.12 | 1.572 |
| R6 | 7.1774 | d6 | 0.394 |  |  |  | 1.563 |
| R7 | 18.3811 | d7 | 0.912 | nd4 | 1.6713 | ν4 | 19.24 | 1.513 |
| R8 | −13.0063 | d8 | 0.213 |  |  |  | 1.571 |
| R9 | 6.5301 | d9 | 0.300 | nd5 | 1.5445 | ν5 | 55.99 | 1.575 |
| R10 | 4.2562 | d10 | 0.800 |  |  |  | 1.599 |
| R13 | Infinity | d13 | 0.210 | nd7 | 1.5168 | ν7 | 64.17 | 1.740 |
| R14 | Infinity | d14 | 6.226 |  |  |  | 1.759 |

TABLE 14

|  | Conic index | aspherical index | | | | | |
| --- | --- | --- | --- | --- | --- | --- | --- |
|  | k | A4 | A6 | A8 | A10 | A12 | A14 |
| R1 | 0.0000E+00 | −3.6913E−04 | −1.0175E−05 | 4.4301E−07 | 0.0000E+00 | 0.0000E+00 | 0.0000E+00 |
| R2 | 0.0000E+00 | −1.0421E−03 | 1.1841E−04 | −2.4348E−06 | 0.0000E+00 | 0.0000E+00 | 0.0000E+00 |
| R3 | 0.0000E+00 | −6.5915E−03 | 1.9896E−03 | −3.0722E−04 | 4.8991E−05 | −6.5579E−06 | 3.8459E−07 |
| R4 | 0.0000E+00 | −2.4059E−02 | 1.4442E−02 | −5.5060E−03 | 1.9499E−03 | −3.5965E−04 | 2.3541E−05 |
| R5 | 0.0000E+00 | −2.3827E−02 | 1.8746E−02 | −8.6741E−03 | 2.5654E−03 | −3.9520E−04 | 2.2751E−05 |
| R6 | 0.0000E+00 | −2.2984E−02 | 3.4147E−02 | −2.3291E−02 | 6.3980E−03 | −7.5028E−04 | 3.1669E−05 |
| R7 | 0.0000E+00 | −1.4388E−03 | 2.6652E−02 | −1.9926E−02 | 6.4467E−03 | −1.2797E−03 | 1.4565E−04 |
| R8 | −3.6278E+01 | −1.4349E−02 | 3.1476E−02 | −2.3732E−02 | 9.4866E−03 | −2.4612E−03 | 3.2745E−04 |
| R9 | 0.0000E+00 | −9.3016E−02 | 5.0902E−02 | −2.7306E−02 | 9.8976E−03 | −2.4814E−03 | 3.2069E−04 |
| R10 | −1.0603E+01 | −6.0636E−02 | 2.5533E−02 | −8.6975E−03 | 1.7905E−03 | −1.7631E−04 | 6.3409E−06 |

TABLE 15

| 2ω (°) | 16.22 |
| --- | --- |
| Fno | 3.00 |
| f (mm) | 18.232 |
| f1 (mm) | 12.163 |
| f2 (mm) | −6.128 |
| f3 (mm) | 15.218 |
| f4 (mm) | 11.480 |
| f5 (mm) | −23.543 |
| TTL (mm) | 17.427 |
| LB (mm) | 7.236 |
| IH (mm) | 2.619 |

As shown in Table 16, the example 5 satisfies the conditions (1)-(7).

Figure 19:
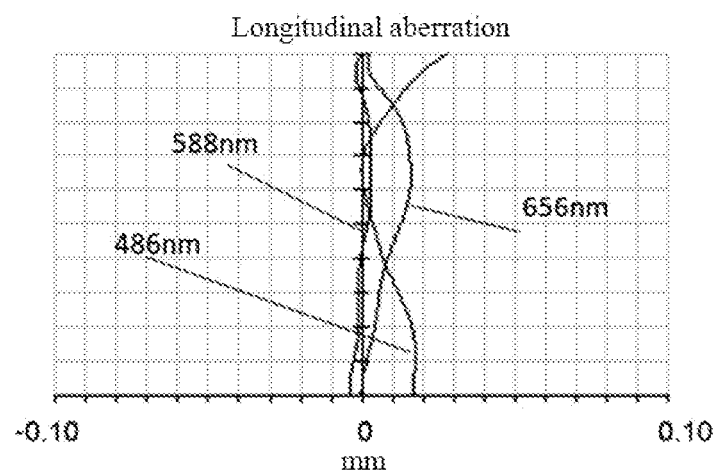
FIG. 19 is a schematic diagram illustrating a longitudinal aberration of the camera lens LA according to the example 5 of the present invention.
Figure 20:
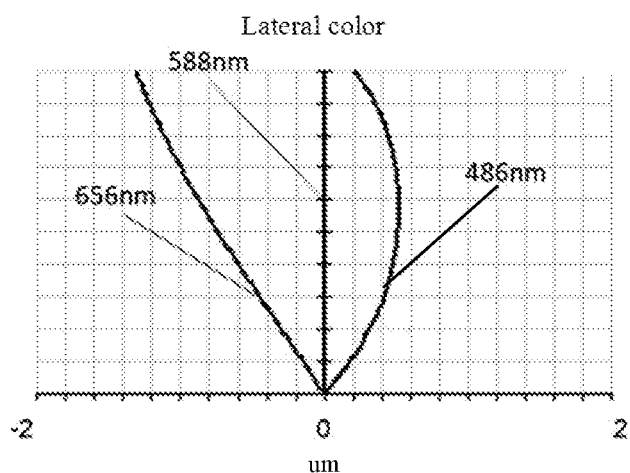
FIG. 20 is a schematic diagram illustrating a lateral color of the camera lens LA according to the example 5 of the present invention.
Figure 21:
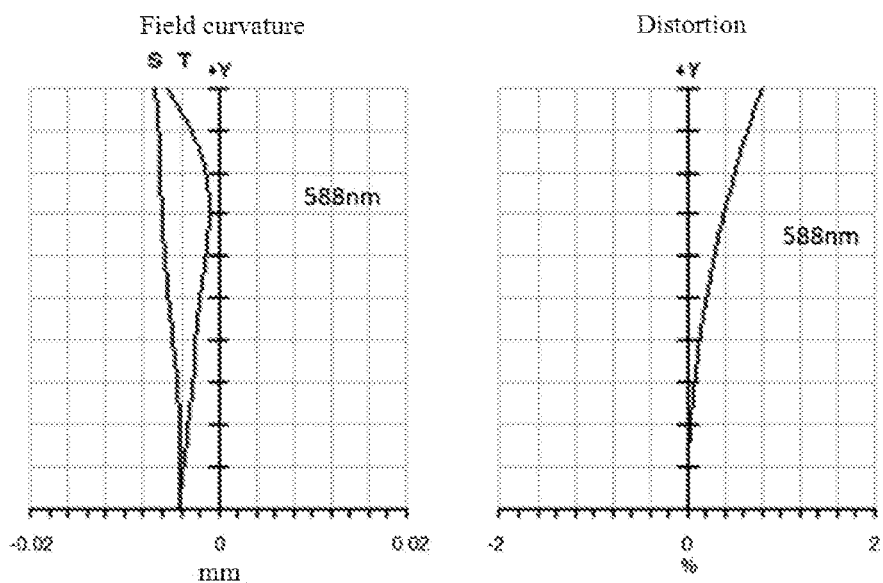
FIG. 21 is a schematic diagram illustrating a field curvature and a distortion of the camera lens LA according to the example 5 of the present invention.

The longitudinal aberration of the camera lens LA of the example 5 is shown in FIG. 19, the lateral color is shown in FIG. 20, and the field curvature and the distortion are shown in FIG. 21. As shown in Table 15, the camera lens LA of the example 5 has good optical characteristics at a narrow angle as shown in FIGS. 19-21.

Table 16 refers to parameters specified in the conditions (1)-(7) of the examples 1-5.

TABLE 16

| | Example 1 | Example 2 | Example 3 | Example 4 | Example 5 | |
|---|---|---|---|---|---|---|
| (f1 + f3 + f4)/f | 1.419 | 2.076 | 1.775 | 2.131 | 2.131 | Conditions (1) |
| (f2/f5)/f | −0.548 | −0.585 | −0.673 | −1.658 | −1.627 | Conditions (2) |
| f3/f | 0.592 | 1.251 | 0.880 | 0.997 | 0.835 | Conditions (3) |
| R5/R6 | 0.670 | 0.970 | 0.719 | 0.814 | 0.560 | Conditions (4) |
| d7/f | 0.048 | 0.094 | 0.059 | 0.059 | 0.050 | Conditions (5) |
| d9/f | 0.026 | 0.026 | 0.022 | 0.026 | 0.016 | Conditions (6) |
| f2/f | −0.285 | −0.245 | −0.376 | −0.306 | −0.336 | Conditions (7) |

Persons of ordinary skill in the related art can understand that, the above examples are specific examples for implementation of the present disclosure, and in actual application, various changes may be made to the forms and details of the examples without departing from the spirit and scope of the present disclosure.

The invention claimed is:

1. A camera lens comprising, from an object side to an image side in sequence, a first lens of a positive refractive power, a second lens of a negative refractive power, a third lens of a positive refractive power, a fourth lens of a positive refractive power and a fifth lens of a negative refractive power, wherein the camera lens satisfies the following conditions (1)-(6):

$$1.40 \leq (f1+f3+f4)/f \leq 2.15 \quad (1);$$

$$-1.70 \leq (f2+f5)/f \leq -0.50 \quad (2);$$

$$0.50 \leq f3/f \leq 1.30 \quad (3);$$

$$0.55 \leq R5/R6 \leq 1.00 \quad (4);$$

$$0.040 \leq d7/f \leq 0.100 \quad (5);$$

$$0.010 \leq d9/f \leq 0.030 \quad (6);$$

where,
f: a focal length of the camera lens;
f1: a focal length of the first lens;
f2: a focal length of the second lens;
f3: a focal length of the third lens;
f4: a focal length of the fourth lens;
f5: a focal length of the fifth lens;
R5: a curvature radius of object side surface of the third lens;
R6: a curvature radius of image side surface of the third lens;
d7: a thickness on-axis of the fourth lens; and
d9: a thickness on-axis of the fifth lens.

2. The camera lens according to claim 1 further satisfying the following condition (7):

$$-0.40 \leq f2/f \leq -0.20 \quad (7).$$

* * * * *